(12) United States Patent
Bostick et al.

(10) Patent No.: US 10,581,935 B2
(45) Date of Patent: Mar. 3, 2020

(54) EVENT DETECTION AND PREDICTION WITH COLLABORATING MOBILE DEVICES

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 751 days.

(21) Appl. No.: 15/221,661

(22) Filed: Jul. 28, 2016

(65) Prior Publication Data

US 2018/0032875 A1    Feb. 1, 2018

(51) Int. Cl.
| | |
|---|---|
| *H04L 29/06* | (2006.01) |
| *H04L 29/08* | (2006.01) |
| *G06Q 10/10* | (2012.01) |
| *H04W 4/029* | (2018.01) |
| *G06Q 10/04* | (2012.01) |
| *G06Q 10/08* | (2012.01) |
| *G06Q 10/06* | (2012.01) |
| *G06N 20/00* | (2019.01) |

(52) U.S. Cl.
CPC ............ *H04L 65/40* (2013.01); *G06Q 10/04* (2013.01); *G06Q 10/06* (2013.01); *G06Q 10/0833* (2013.01); *G06Q 10/10* (2013.01); *G06Q 10/101* (2013.01); *H04L 67/00* (2013.01); *H04L 67/22* (2013.01); *H04W 4/029* (2018.02); *G06N 20/00* (2019.01)

(58) Field of Classification Search
CPC ......... H04L 65/40; H04L 67/00; H04L 67/22; H04L 65/00; H04W 4/029; G06Q 10/04; G06Q 10/06; G06Q 10/0833; G06Q 10/10; G06Q 10/101; G06N 20/00; G06N 20/10; G06N 20/20
USPC .......................................... 706/45
See application file for complete search history.

(56) References Cited

U.S. PATENT DOCUMENTS

| | | |
|---|---|---|
| 8,935,319 B2 | 1/2015 | Calo et al. |
| 8,935,368 B2 | 1/2015 | Calo et al. |

(Continued)

OTHER PUBLICATIONS

Anonymously; Dynamically composing an identification image to represent shared contacts and surrounding environment, Aug. 31, 2014.

(Continued)

*Primary Examiner* — Shane D Woolwine
(74) *Attorney, Agent, or Firm* — Garg Law Firm, PLLC; Rakesh Garg; James Nock (57) ABSTRACT

A set of data is received at a server from a corresponding set of mobile devices. At the server, a first data in the set of data is analyzed, the first data being received from a first device in the set of mobile devices, the analyzing detecting an event of interest in the first data, the event occurring in a first geographical area. Using the event, a future event is predicted in a second geographical area. A target area is computed, where the target area includes a location where the future event is likely to occur. A notification about the future event is sent to a second set of devices located in the target area.

17 Claims, 6 Drawing Sheets

(56) References Cited

U.S. PATENT DOCUMENTS

| | | | |
|---|---|---|---|
| 9,286,781 B2* | 3/2016 | Filson | H04L 12/1895 |
| 2011/0314107 A1* | 12/2011 | Garcia | G06F 8/63 |
| | | | 709/206 |
| 2011/0314144 A1* | 12/2011 | Goodman | G06Q 10/06 |
| | | | 709/224 |
| 2013/0268935 A1* | 10/2013 | Paul | G06F 9/44552 |
| | | | 718/100 |
| 2013/0282804 A1 | 10/2013 | Mate et al. | |
| 2014/0025755 A1* | 1/2014 | Hughes | G06Q 10/10 |
| | | | 709/206 |
| 2014/0285337 A1 | 9/2014 | Gebhardt | |

OTHER PUBLICATIONS

Anonymously; Mobile Phone Proximity Alert Warning System, Feb. 2, 2016.

Suffusion theme by Sayontan Sinha, Business, Surveillance, New Google patent suggests automatically sending your videos and photos to law enforcement, Jan. 31, 2014, https://www.pogowasright.org/new-google-patent-suggests-automatically-sending-your-videos-and-photos-to-law-enforcement/.

* cited by examiner

EVENT DETECTION AND PREDICTION WITH COLLABORATING MOBILE DEVICES

TECHNICAL FIELD

The present invention relates generally to a method, system, and computer program product for detecting events of interest in data captured by mobile devices. More particularly, the present invention relates to a method, system, and computer program product for event detection and prediction with collaborating mobile devices.

BACKGROUND

Hereinafter, a digital image is interchangeably referred to as simply "images" or "image" unless expressly disambiguated where used. Video data—or simply "video"—comprises data of a series of images.

An image is a digital representation or facsimile of a physical object or a collection of physical objects. Technology presently exists to detect or recognize certain objects that are present in a given image. For example, a digital camera can recognize that objects, such as human faces or human eyes, are present in an image created by the camera lens on the sensor of the camera. Photo editing software can recognize that objects, such as buildings or straight lines, are present in an image being edited. Object detection in images relies upon identifying those features of those objects for which the object detection technology has been programmed or trained.

Audio data—or simply "audio"—comprises digital representation of sound. The sound may be human speech as well as sounds made by objects and other beings. Technology presently exists to detect or recognize certain sound patterns that are present in a given audio. For example, an audio processing system can recognize that sound patterns, such as certain spoken words or a car-crash, are present in a given audio. Audio analysis software can also recognize other characteristics of sound patterns—such as inflection, stress, or panic—are present in an audio being analyzed. Sound pattern detection in audio relies upon identifying those features of those patterns for which the sound pattern detection technology has been programmed or trained.

Many Wireless data processing systems, wireless data communication devices, or wireless computing platforms (collectively and interchangeably referred to herein as "mobile device" or "mobile devices") are capable of capturing audio, video, and image data. For example, many mobile devices not only allow the users to make voice calls, but also capture audio, video, and image data through one or more components, such as microphones as cameras, that are built into or associated with the mobile device. A mobile device can access remote data processing systems, determine a user's location or activity, communicate with other mobile devices or data processing systems, or perform web-based interactions and other transactions.

Wearable devices are a category of mobile devices. A wearable device is essentially a mobile device, but has a form-factor that is suitable for wearing the device on a user's person. A user can wear such a device as an article of clothing, clothing or fashion accessory, jewelry, a prosthetic or aiding apparatus, an item in an ensemble carried by or with a person, an article or gadget for convenience, and the like. Some examples of presently available wearable devices include, but are not limited to, smart watches, interactive eyewear, devices embedded in footwear, headgear or head-wear mounted devices, devices wearable as rings or pendants, and pedometers and other clip-ons.

Some wearable devices are independent wearable devices in that they can operate as stand-alone mobile devices. Such a wearable device either includes some or all the capabilities of a mobile device described above or does not need or use the capabilities of a mobile device described above.

Other wearable devices are dependent wearable devices in that they operate in conjunction with a mobile device. Such a wearable device performs certain functions while in communication with a mobile device described above.

SUMMARY

The illustrative embodiments provide a method, system, and computer program product. An embodiment includes a method that receives, at a server, a set of data is received from a corresponding set of mobile devices. The embodiment analyzes, at the server, a first data in the set of data, the first data being received from a first device in the set of mobile devices, the analyzing detecting an event of interest in the first data, the event occurring in a first geographical area. The embodiment predicts, using the event, a future event in a second geographical area. The embodiment computes a target area, wherein the target area includes a location where the future event is likely to occur. The embodiment sends a notification about the future event to a second set of devices located in the target area.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

An event is an activity that is occurring or a circumstance that is created in a geographical area surrounding a user, with or without the participation of the user. Some non-limiting examples of events contemplated within the scope of the illustrative embodiments are automobile accidents, altercations between people, an undesirable behavior or actions of a person or animal, the presence of an undesirable object—such as a weapon or debris, the absence or undesirable operation of a desirable or expected object—such as a driverless vehicle moving on the road or a washed-away bridge, the existence of fire or other peril, and many others.

The illustrative embodiments recognize that often events transpire around people but people are either inattentive to perceive those events, realize after-the-fact that an event has occurred, or are unable to recognize or capture sufficient information about the event until it is too late. The illustrative embodiments further recognize that even when a person is able to capture some part of the event, there is no guarantee that the captured part is accurate, usable, or sufficient to further investigate the event.

Additionally, the illustrative embodiments recognize that capturing an event, e.g., by capturing the audio, video, or image of the event, is a voluntary action on the part of a person. For example, a person, who is suitably situated relative to an event, and who is capable of capturing some data of the event, can choose not to capture anything at all.

Furthermore, even when a person captures some data of the event, sharing that data with other users is also a voluntary action on the part of the person who captures the data. In most cases, the captured data either remains locked up in the person's mobile device, or is shared with other people chosen by the person, at a time chosen by the person, and in a manner chosen by the person.

The illustrative embodiments recognize that the capability to automatically capture data of the events transpiring in the perceivable surrounding area of a mobile device would remove or reduce the chances of missing the event and other voluntary aspects of capturing and sharing the event. The illustrative embodiments further recognize that automatically determining whether the captured data has something that might be of interest to others would also be useful for similar reasons.

The illustrative embodiments recognize that an ability to validate, substantiate, supplement, reinforce, or augment the detection of an event in the captured data of one device with the captured data of another device will also be useful. The collection and processing of captured data from multiple devices that may have been present in a geographical area from where the event may have been perceptible, would allow for the detection of events with a high degree of confidence.

Furthermore, the processing of captured data from multiple devices can also allow the illustrative embodiments to predict a path of the event—if the event involves movement or transportation. Such processing according to the illustrative embodiments would also allow predicting a future event in a progression of events.

The illustrative embodiments used to describe the invention generally address and solve the above-described problems and other problems related to event detection and forecasting using mobile devices.

An embodiment can be implemented as a software application. The device-side application implementing an embodiment can be configured as a modification of an existing mobile device. A server-side application implementing an embodiment can be configured as a modification of an existing audio, video, or image data analysis system, or as a separate application that operates in conjunction with an existing analysis system, a standalone application, or some combination thereof.

An embodiment implemented in a mobile device (a device-side embodiment) automatically and continuously collects data from the surroundings that are perceptible from a component of the device. For example, the embodiment collects audio data corresponding to all the sounds that are received at a microphone of the mobile device, from the surroundings of the mobile device. Similarly, the embodiment collects image or video data corresponding to all the sights that are within the view of a camera of the mobile device, from the surroundings of the mobile device.

The embodiment stores the collected data temporarily, i.e., for a period of time, in a local data storage configured at the device. In one embodiment, the storage for storing such automatically and continuously collected data is separate from the storage used for storing data voluntarily collected by the user of the mobile device.

While the collected data is in the local storage, an embodiment performs a suitable analysis on the collected data to determine whether an event can be detected in that data. In other words, the embodiment determines whether any part of the temporarily stored collected data has been contributed by an event.

The analysis performed by the embodiment includes audio analysis, video analysis, and/or image analysis depending on the type of data captured. For example, if the camera of the device is obstructed by the fabric of the user's pocket, the captured data may only include audio data that is usable. Accordingly, the embodiment performs audio analysis of the data. Similarly, if the microphone of the device is disabled or captures only wind noise, the embodiment may perform only video or image analysis on the usable data captured by the camera.

The events that the analysis of the embodiment detects on-board the device are pre-configured into the embodiment. For example, an analysis component of the embodiment can be trained to detect a set of events. Accordingly, while operating on the temporarily stored captured data, the analysis component performs computations to determine if one or more events from the trained set of events can be detected in the data.

If not event is detected in the data, the embodiment discards the data from the local storage. For example, the data may be deleted, or the storage space occupied by the data may be enabled for overwriting.

The continuous capturing of the data stores the captured data as a loop. I.e., the data is written to the local storage until the designated amount of storage space in the local storage is filled, at which point, the writing continues by overwriting the oldest data stored in the local storage, by overwriting the data that is otherwise enabled for overwriting, or both.

If an event is detected in the data, the embodiment uploads a portion of the captured data to an embodiment executing on a remote data processing system, e.g., on a server data processing system (server-side embodiment). Specifically, the portion of the data that is uploaded includes data captured starting at some time prior to the detected event, the data of the event, and data captured up to some time after the event. For example, the uploaded data may include a period beginning fifteen seconds prior to the event and ending forty-five seconds after the event.

Any number of devices may be operating independent of each other in a geographical area from where an event may be perceptible. If more than one such devices include a device-side embodiment described herein, multiple devices may upload data of periods surrounding the event, likely from different perspectives or positions in that geographical area.

A server-side embodiment can therefore receive multiple uploads from multiple devices relative to the same event. In some cases, as the event progresses through time and space, or a chain of events progress through time and space, different device-side embodiment may capture different parts of the progression. Accordingly, the server-side embodiment may receive uploaded data from different devices, where the data pertains to the same general event or chain of events, but provides information about different stages of the progression. It is also possible that a single device may provide multiple uploads, e.g., while continuing to detect the progression of an event over different periods and uploading different data portions corresponding to those different periods.

When multiple uploads are received from one or more devices, a server-side embodiment analyzes the uploads and sequences the events detected in those uploads according to a time sequence of those events. For example, event 1 in upload 1 from device-side embodiment 1 in device 1 may have occurred before event 2 in upload 2 from device-side embodiment 2 in device 2; event 2 in upload 2 from device-side embodiment 2 in device 2 may have occurred before event 3 in upload 3 from device-side embodiment 3 in device 3; and so on. Thus, the server-side embodiment constructs a time sequence of the events detected in the different uploaded portions of data.

A server-side embodiment uses the time sequencing of event or events to predict a path of the events. For example, if event 1 occurs at time 1 at point 1, event 2 occurs at time 2 at point 2, and event 3 occurs at time 3 at point 3, the embodiment computes a likelihood of event 4 occurring at time 4 and point 4. The embodiment also computes a likelihood of event 4 occurring at all. Thus, the embodiment predicts a future event, a location and time of the future event, and a likely path the progression of events will take to cause the future event at that future time and place.

A server-side embodiment also classifies the event or events detected in one or more uploads. Some classes of events may only affect the user whose device captured the event and may not be of public interest. Some other classes of events may be of interest to law enforcement persons and information about such events cannot or should not be disseminated to others. Some other classes of events may be of interest to the general public. Many other classes of events and their treatments are possible, and the same are contemplated within the scope of the illustrative embodiments.

If an event or events fall into a classification that can be of interest to other users, an embodiment selects suitable targets to disseminate information about the event or events. For example, the embodiment determines that if events 1, 2, and 3 occur in succession at the entrance of a park, quarter-ways into the park, and halfway into the park, then users who are near the exit of the park should be informed of a possible event 4 occurring near the exit of the park soon. In general terms, target selection selects a geographical area within which any device capable of receiving a notification about the events should be notified. The notification may be about only the event or events that have already occurred and have been detected, about a future event, a future location of the event, a path of the events, or some combination thereof.

As an example, to notify devices near the exit of the park, the embodiment selects a cell tower, or causes a selection of a cell tower, that is most likely to be used by mobile devices near the exit of the park. The embodiment transmits a notification such that the selected cell tower will broadcast the notification, the broadcast causing a set of devices communicating with the tower to receive the notification.

The on-device capturing of data, on-device analysis, uploads from one or more devices, the server-side analysis and classification, prediction of future event and path, and notification can repeat as long as may be needed given the occurrences of events.

A method of an embodiment described herein, when implemented to execute on a device or data processing system, comprises substantial advancement of the functionality of that device or data processing system in detecting events in a given environment. For example, presently, a user has to overtly and actively capture data of an event while the event is occurring. Presently, the user has to also overtly and voluntarily decide whether, when, and how to share that captured event data. An embodiment provides a method for automatically and continuously capturing data of the surroundings of a mobile device. An embodiment further determines, on-device, whether reasons exist in the data to send the data for more analysis and dissemination. A server-side analysis detects, sequences, and classifies the events. An embodiment forecasts a future event, a location and time of the future event, a path from a past event to the future event, or some combination thereof. An embodiment selects targets for notification and sends out the notification about the events or a forecasted event. This manner of event detection and prediction with collaborating mobile devices is unavailable in the presently available methods. Thus, a substantial advancement of such devices or data processing systems by executing a method of an embodiment is in detection of more events transpiring around people, predicting future events, and notifying a suitable target audience about the events and the forecasts.

The illustrative embodiments are described with respect to certain types of events, types of data, analyses, periods, times and sequences, locations and paths, targets, notifications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
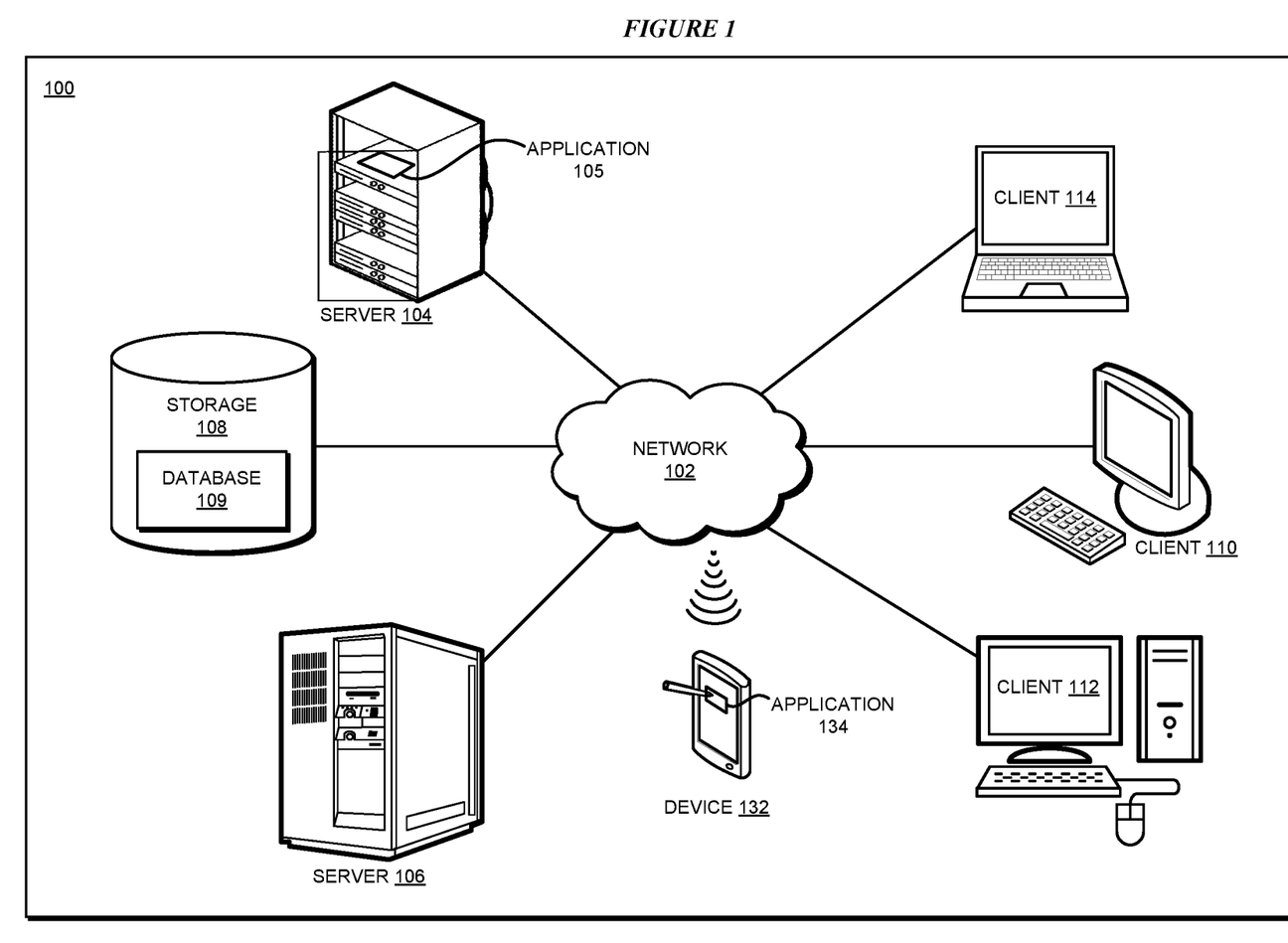
FIG. 1 depicts a block diagram of a network of data processing systems in which illustrative embodiments may be implemented.
Figure 2:
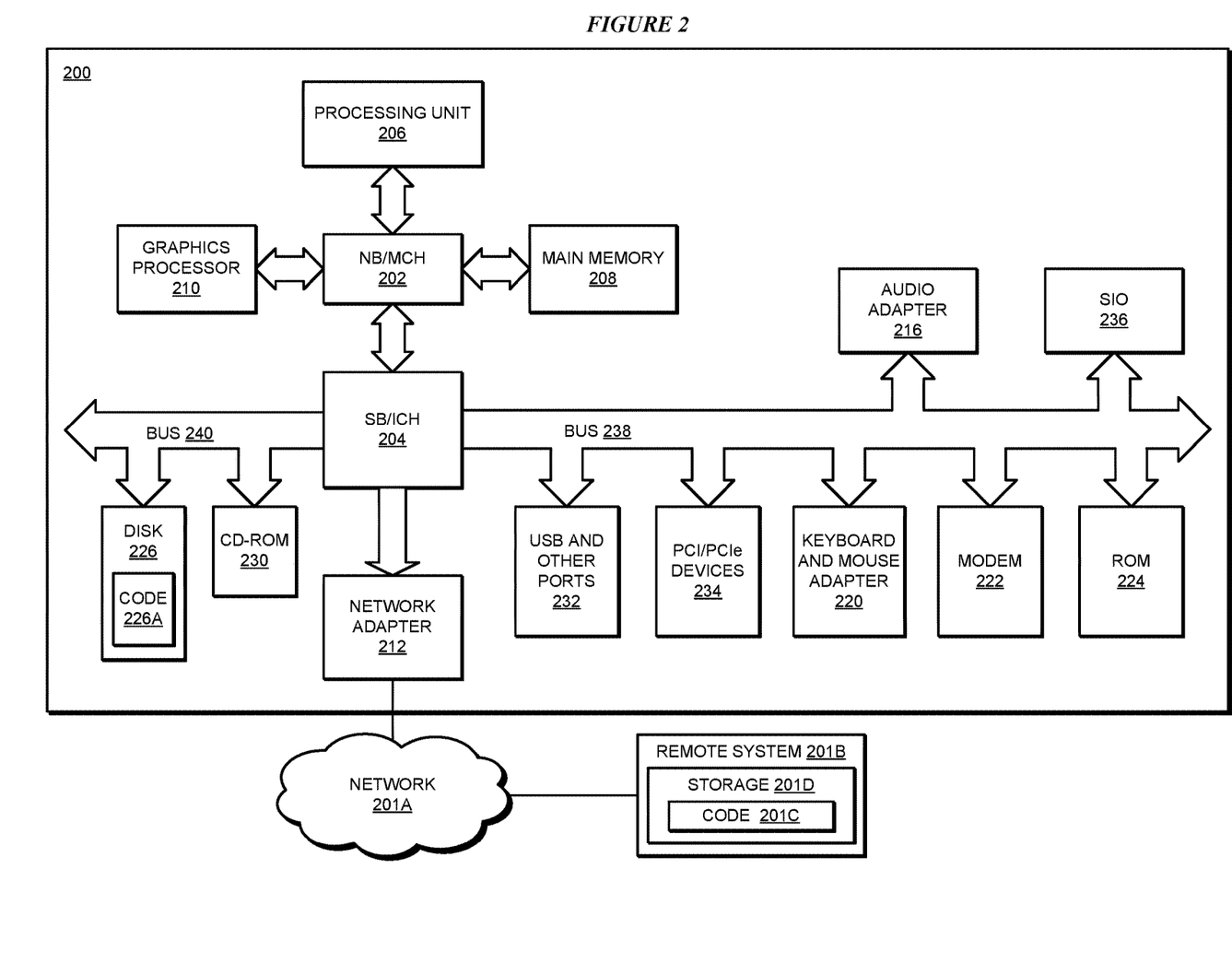
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108 (storing database 109). Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements a server-side embodiment described herein. Application 134 implements a device-side embodiment as described herein. Device 132 is equipped with suitable components (not shown), to capture a type of data described herein. For example, a microphone component is available in device 132 to capture audio data, and a camera component is available in device 132 to capture image or video data.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
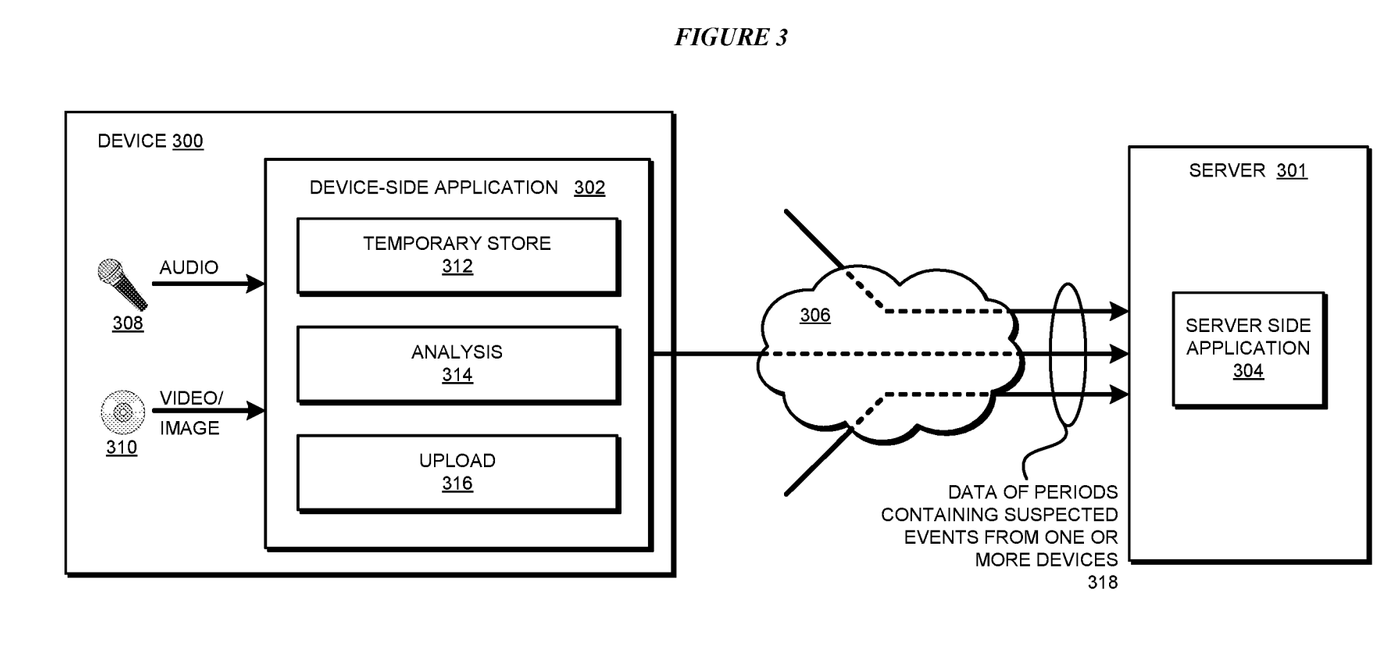
FIG. 3 depicts a block diagram of a part of an example configuration for event detection and prediction with collaborating mobile devices in accordance with an illustrative embodiment.

With reference to FIG. 3, this figure depicts a block diagram of a part of an example configuration for event detection and prediction with collaborating mobile devices in accordance with an illustrative embodiment. Device 300 is an example of device 132 in FIG. 1. Server 301 is an example of server 104 in FIG. 1. Application 302 is an example of application 134 in FIG. 1. Application 304 is an example of application 105 in FIG. 1. Network 306 is an example of network 102 in FIG. 1.

Microphone 308 is a component of device 300 and is usable to capture sounds from which audio data can be constructed. Camera 310 is a component of device 300 and is usable to capture images and video from which image data and video data, respectively, can be constructed.

Device 300 is one example device that is executing application 302, which implements a device-side embodiment described herein. Any number of such devices with such applications can be executing in a geographical area at any given time.

Component 312 collects data, e.g., audio data formed using audio input from microphone 308, image data formed using image input from camera 310, video data formed using video input from camera 310, or some combination thereof. Component 312 stores the collected data temporarily in a local storage as described herein. Component 312 manages the looping storage of data in the local storage, managing the overwriting as described herein.

Component 314 analyzes a portion of the captured and temporarily stored data. Particularly, component 314 analyzes the data portion to determine whether an event can be detected in the data portion. The event being analyzed for is from a set of events that component 314 is programmed or trained to detect.

Presently, the computational capabilities of mobile devices are a limiting factor on how much data analysis can be performed in a reasonable time on-device. Therefore, component 314 may be trained with only a limited set of events, limited ways of detecting the events, fast but inaccurate algorithms to perform the detection, or a combination thereof. Consequently, an event detection on-device may be regarded as a suspicion of an event, which has to be verified and confirmed by comparatively more extensive analysis on the server-side.

If an event is detected, or suspected to be present with a greater than a threshold degree of likelihood during the analysis of a data portion, component 316 uploads that component to server-side application 304 over network 306.

Data 318 includes such a data portion from component 316. Data 318 can include and any number of other data portions containing the same or different detected or suspected events from device 300 and/or other similarly configured devices.

Figure 4:
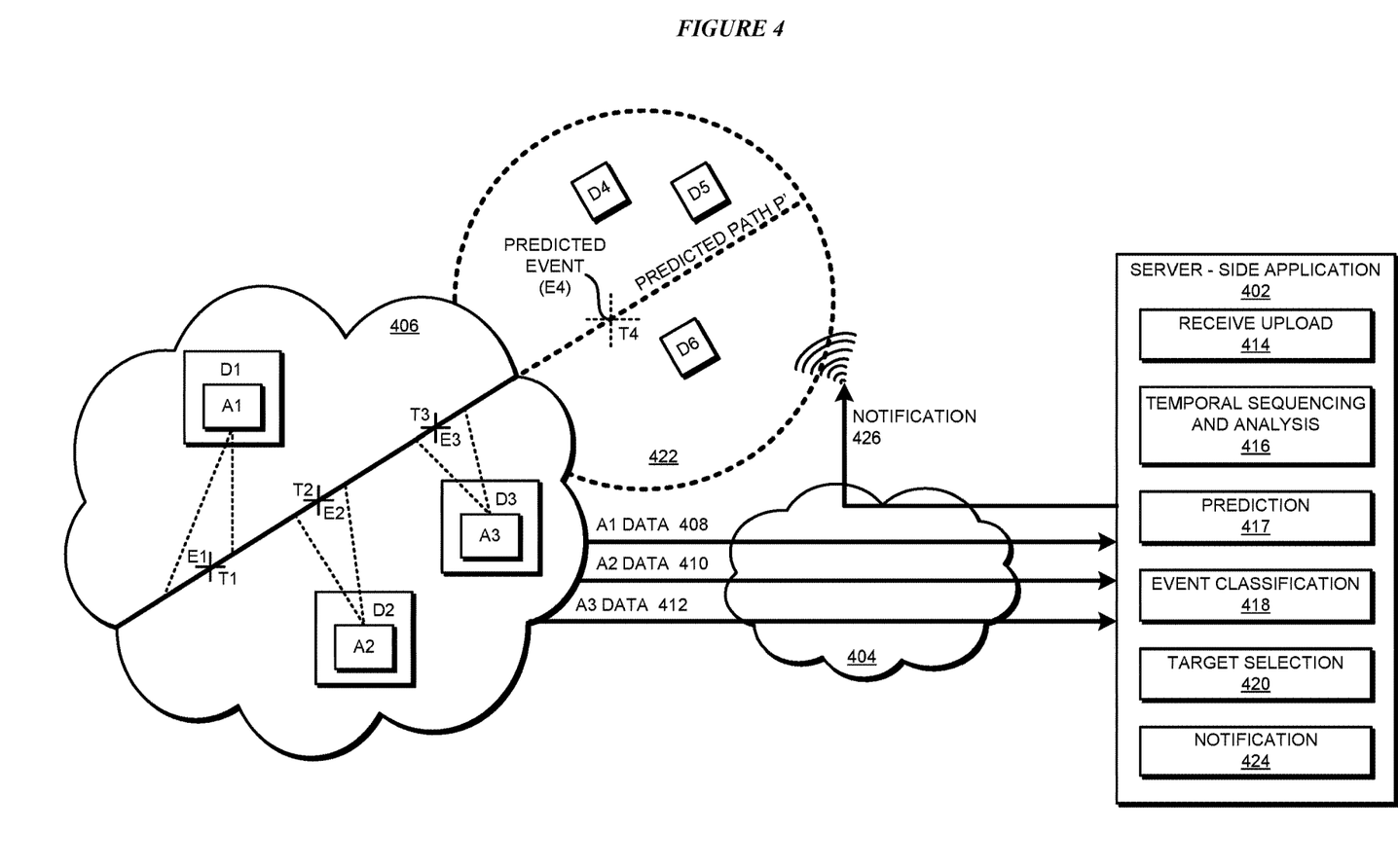
FIG. 4 depicts a block diagram of another part of an example configuration for event detection and prediction with collaborating mobile devices in accordance with an illustrative embodiment.

With reference to FIG. 4, this figure depicts a block diagram of another part of an example configuration for event detection and prediction with collaborating mobile devices in accordance with an illustrative embodiment. Server-side application 402 is an example of server-side application 304 in FIG. 3. Network 404 is an example of network 308 in FIG. 3.

Each of devices D1, D2, and D3, is an example of device 300 in FIG. 3. Each of applications A1, A2, and A3, executing in devices D1, D2, and D3, respectively, is an example of device-side application 302 in FIG. 3.

Assume that device-application combinations D1-A1, D2-a2, and D3-A3 are operating in geographical area 406. An event occurs at time T1 within a perceivable perimeter of A1. The event continues or progresses, or another event in the same chain of events occurs at time T2 within a perceivable perimeter of A2. Similarly, the event continues or progresses, or another event in the same chain of events occurs at time T3 within a perceivable perimeter of A3.

From detecting the event at T1, A1 uploads data 408 to application 402. Similarly, from detecting the event at T2, A2 uploads data 410 to application 402, and from detecting the event at T3, A3 uploads data 412 to application 402. Note that more than one device can perceive event at T1 (or T2 or T3) and upload the data of the same event in a similar manner.

Component 414 receives example data uploads 408, 410, and 412. Component 414 stores the received data in a temporary storage on the server-side, and manages the storage space in a manner similar to the local storage management performed by component 312 of FIG. 3 on the device-side.

Component 416 analyzes the uploaded data to detect an event of interest. Component 416 can be configured with a comparatively larger set of events, more complex detection methods, algorithms of higher accuracy, or a combination thereof. If the uploaded data indicates a progression or chain of events, component 416 constructs a time sequence of the events in the progression or chain. For example, in the depicted scenario, component 416 sequences event E1 occurring at T1, followed by event E2 occurring at T2, followed by event E3 occurring at T3.

Prediction component 417 uses the sequencing of events E1, E2, and E3 to compute path P that has been taken by the progression or chain of events E1, E2, and E3. Component 417 predicts path P' that is likely to be taken by event E4 at future time T4. Component 417 also predicts future E4 with a likelihood of occurrence.

Component 418 classifies events E1, E2, E3, and future event E4. Suppose that the classification is such that other users should be notified. Accordingly, component 420 identifies target area 422 around predicted path P' where users should be notified. Component 420 selects a transmission method, e.g., a cell tower that covers area 422, to which devices in area 422, e.g., devices D4, D5, and D6 connect.

Component 424 composes notification 426 for the users in target area 422. For example, notification 426 may inform the users of devices D4, D5, and D6 that events E1, E2, and/or E3 have occurred near them and future event E4 is likely to occur in their general area at time T4. Other variations of notification 426 are contemplated within the scope of the illustrative embodiments.

Component 424 sends notification 426 to the selected transmission method. The selected transmission method broadcasts or otherwise transmits notification 426 such that notification 426 is received by devices D4, D5, and D6. Devices D4, D5, and D6 can, but need not, be enabled by a device-side embodiment described herein.

Figure 5:
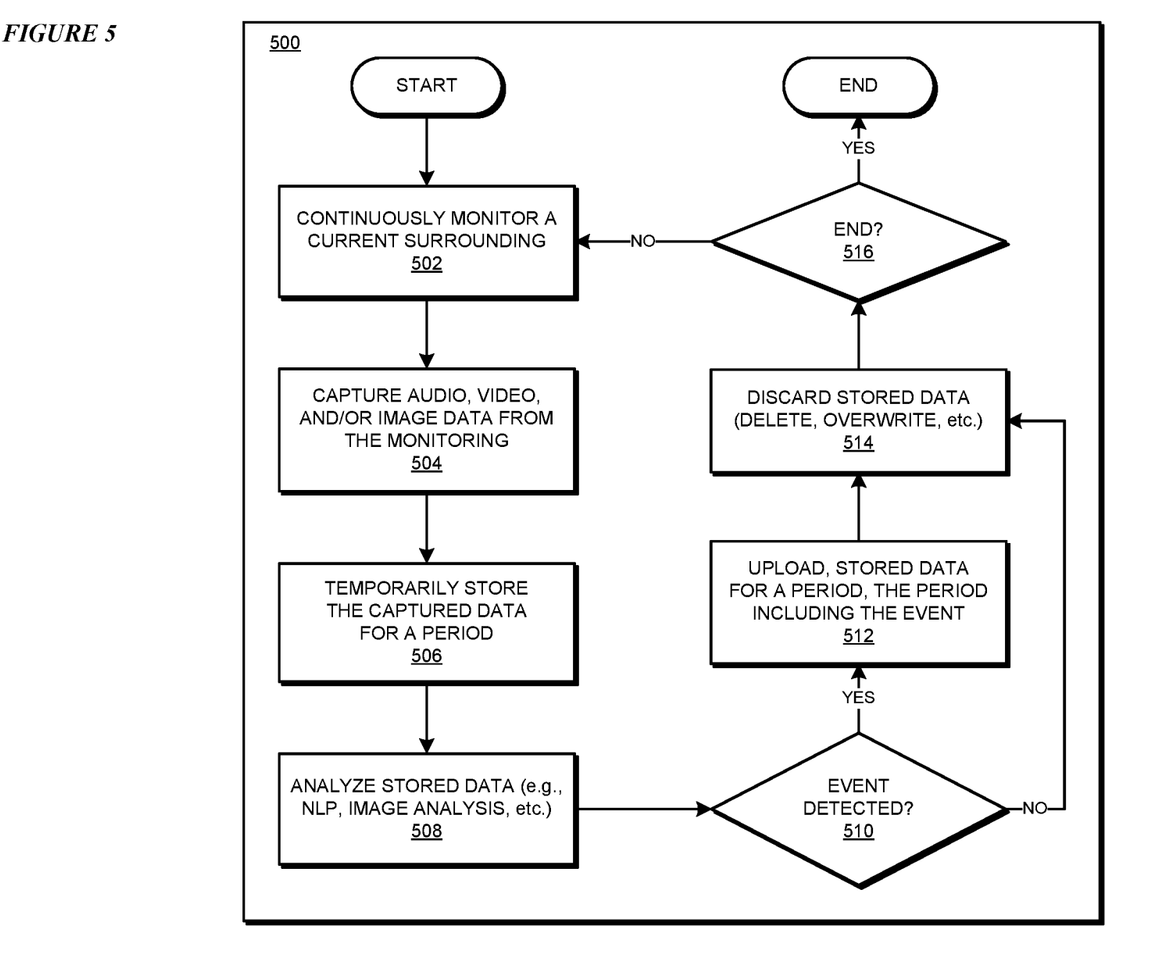
FIG. 5 depicts a flowchart of an example device-side process for event detection and prediction with collaborating mobile devices in a accordance with an illustrative embodiment.

With reference to FIG. 5, this figure depicts a flowchart of an example device-side process for event detection and prediction with collaborating mobile devices in a accordance with an illustrative embodiment. Process 500 can be implemented in application 302 in FIG. 3.

The application continuously and without user-intervention monitors a currently perceptible area surrounding a mobile device where the application is executing (block 502). The area is perceptible in the sense that a component of the mobile device can receive a sound, a sight, or both, from the area.

The application captures audio, video, and/or image data from the monitoring (block 504). The application temporarily stores the captured data for a period at a local storage in the mobile device (block 506).

The application analyzes the stored data, e.g., by performing Natural Language Processing (NLP) on the speech content of the data, sound analysis on other sounds, image analysis on the image content of the data, or both, to detect an event for which the application is trained (block 508). The application determines whether an event is detected in the analyzed data (block 510).

If an event is detected ("Yes" path of block 510), the application uploads the stored data for a period such that the period includes the event and preferably data from some time before and some time after the event as well (block 512). The application discards the stored data that has been uploaded (block 514). If no event is detected in the analyzed data ("No" path of block 510), the application discards the analyzed data at block 514.

The application determines whether to end the monitoring of the surroundings (block 516). If the monitoring has to be continued ("No" path of block 516), the application returns to block 502. If the monitoring should be ended ("Yes" path of block 516), the application ends process 500 thereafter.

Figure 6:
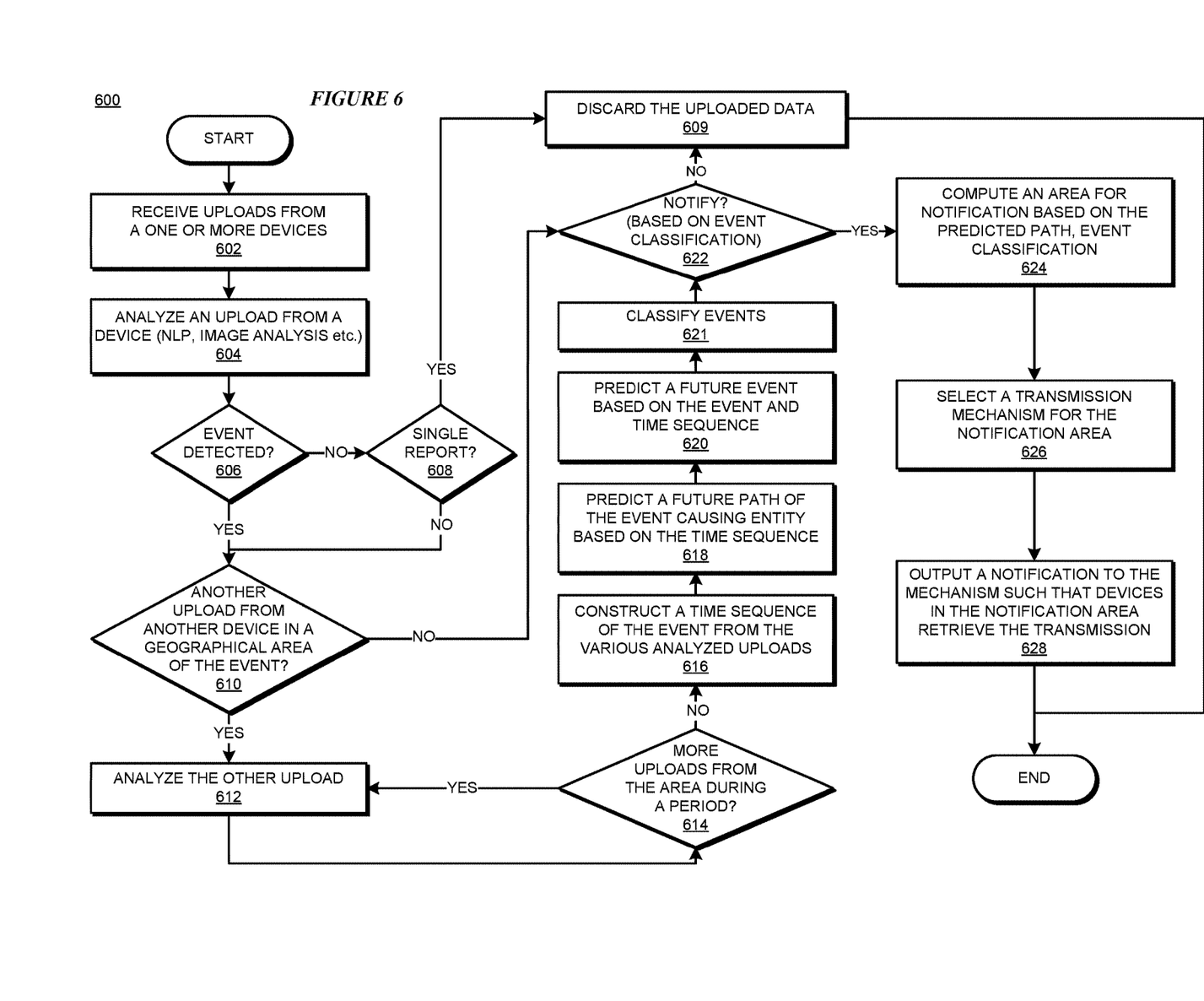
FIG. 6 depicts a flowchart of a server-side process for event detection and prediction with collaborating mobile devices in accordance with an illustrative embodiment.

With reference to FIG. 6, this figure depicts a flowchart of a server-side process for event detection and prediction with collaborating mobile devices in accordance with an illustrative embodiment. Process 600 can be implemented in application 402 in FIG. 4.

The application receives upload of data from one or more devices (block 602). The application analyzes an upload from a device, e.g., by performing NLP on the speech content of the data, sound analysis on other sounds, image analysis on the image content of the data, or both, to detect an event for which the application is trained (block 604). In some cases, the analysis of block 604 may be far more detailed or sophisticated as compared to the analysis of block 508 in FIG. 5.

The application determines whether an event has been detected in the analysis (block 606). If not event has been detected ("No" path of block 606), the application determines whether the uploaded data as a single report from a device (block 608). In some cases, an on-device analysis may produce a false positive detection of an event and cause an upload, which is likely to be a single upload with the false positive. If the upload is a single upload, i.e., the device or other devices have not also send additional uploads ("Yes" path of block 608), the application discards the uploaded data (block 609). The application ends process 600 thereafter.

If an event has been detected ("Yes" path of block 606), or if the upload is not a single upload, i.e., if the same device or other devices have provided additional uploads resulting from event detections in those devices ("No" path of block 608), the application determines whether another upload from another device in the same geographical area has been made (block 610).

If no other upload from another device has been made ("No" path of block 610), the application proceeds to block 621. If another upload from another device has been made ("Yes" path of block 610), the application analyzes the other upload in a manner similar to the analysis of block 604 (block 612). The application determines if more uploads from the area during for an overlapping period remain to be analyzed (block 614). If more uploads remain to be analyzed ("Yes" path of block 614), the application returns to block 612 and analyzes another upload in a similar manner.

If no more uploads remain to be analyzed ("No" path of block 614), the application constructs a time sequence of the event from the various analyzed uploads (block 616). The application predicts a future path of the event or event-causing entity, based on the time sequence (block 618). Block 618 may not always produce a prediction. The application predicts a future event based on the detected event and the time sequence (block 620). Block 620 may not always produce a prediction.

The application classifies the detected and/or predicted events (block 621). The application determines whether the classification justifies producing a notification to other users (block 622). If the notification is not justified ("No" path of block 622), the application discards the uploaded data at block 609 and ends process 600 thereafter.

If the notification is justified ("Yes" path of block 622), the application computes a target area for the notification based on the predicted path, event classification, or both (block 624). The application selects a transmission method for the target are (block 626). The application outputs the notification to the transmission method such that one or more devices located in the target area receive the notification from the transmission method (block 628). The application ends process 600 thereafter.

Thus, a computer implemented method, system or apparatus, and computer program product are provided in the illustrative embodiments for event detection and prediction with collaborating mobile devices and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, at a server, a set of data from a corresponding set of mobile devices, the set of data comprising audio data and image data constructed using a component of a mobile device in the set of mobile devices, the set of data received responsive to a first event detection algorithm executing on the mobile device detecting an event of interest within audio data and image data collected at the mobile device with a greater than threshold likelihood, the set of data comprising audio data and image data collected at the mobile device during a time period extending from a predetermined time before the event to a predetermined time after the event, the time period including the event;
analyzing, at the server, using a second event detection algorithm, a first data in the set of data, the first data being received from a first device in the set of mobile devices, the second algorithm having a greater accuracy than the first event detection algorithm, the analyzing detecting the event in the first data, the event occurring in a first geographical area;

predicting, using the event, a future event in a second geographical area;

computing a target area, wherein the target area includes a location where the future event is likely to occur;

sending a notification about the future event to a second set of devices located in the target area.

2. The method of claim 1, further comprising:

selecting a transmission method for the target area; and sending the notification to the transmission method wherein the transmission method causes the sending of the notification to the second set of devices.

3. The method of claim 1, further comprising:

classifying the event in a class, wherein the target area is a function of the class, and wherein the sending the notification is responsive to the class being configured for the notification.

4. The method of claim 1, further comprising:

analyzing a second data in the set of data, the second data being received from a second device in the set of mobile devices, the analyzing the second data detecting a second event of interest in the second data, the second event occurring in the first geographical area, the event and the second event forming a chain of events;

computing a path taken by the chain of events; and predicting a future path, wherein the future path includes the location where the future event is likely to occur, and wherein the target area is selected based on the future path.

5. The method of claim 1, wherein the first geographical area is adjacent the second geographical area.

6. A computer usable program product comprising one or more computer-readable storage devices, and program instructions stored on at least one of the one or more storage devices, the stored program instructions comprising:

program instructions to receive, at a server, a set of data from a corresponding set of mobile devices, the set of data comprising audio data and image data constructed using a component of a mobile device in the set of mobile devices, the set of data received responsive to a first event detection algorithm executing on the mobile device detecting an event of interest within audio data and image data collected at the mobile device with a greater than threshold likelihood, the set of data comprising audio data and image data collected at the mobile device during a time period extending from a predetermined time before the event to a predetermined time after the event, the time period including the event;

program instructions to analyze, at the server, using a second event detection algorithm, a first data in the set of data, the first data being received from a first device in the set of mobile devices, the second algorithm having a greater accuracy than the first event detection algorithm, the analyzing detecting the event in the first data, the event occurring in a first geographical area;

program instructions to predict, using the event, a future event in a second geographical area;

program instructions to compute a target area, wherein the target area includes a location where the future event is likely to occur;

program instructions to send a notification about the future event to a second set of devices located in the target area.

7. The computer usable program product of claim 6, further comprising:

program instructions to select a transmission method for the target area; and program instructions to send the notification to the transmission method wherein the transmission method causes the sending of the notification to the second set of devices.

8. The computer usable program product of claim 6, further comprising:

program instructions to classify the event in a class, wherein the target area is a function of the class, and wherein the sending the notification is responsive to the class being configured for the notification.

9. The computer usable program product of claim 6, further comprising:

program instructions to analyze a second data in the set of data, the second data being received from a second device in the set of mobile devices, the analyzing the second data detecting a second event of interest in the second data, the second event occurring in the first geographical area, the event and the second event forming a chain of events;

program instructions to compute a path taken by the chain of events; and program instructions to predict a future path, wherein the future path includes the location where the future event is likely to occur, and wherein the target area is selected based on the future path.

10. The computer usable program product of claim 6, wherein the first geographical area is adjacent the second geographical area.

11. The computer usable program product of claim 6, wherein the program instructions are stored in a computer readable storage device in a data processing system, and wherein the program instructions are transferred over a network from a remote data processing system.

12. The computer usable program product of claim 6, wherein the program instructions are stored in a computer readable storage device in a server data processing system, and wherein the program instructions are downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, at a server, a set of data from a corresponding set of mobile devices, the set of data comprising audio data and image data constructed using a component of a mobile device in the set of mobile devices, the set of data received responsive to a first event detection algorithm executing on the mobile device detecting an event of interest within audio data and image data collected at the mobile device with a greater than threshold likelihood, the set of data comprising audio data and image data collected at the mobile device during a time period extending from a predetermined time before the event to a predetermined time after the event, the time period including the event;

program instructions to analyze, at the server, using a second event detection algorithm, a first data in the set of data, the first data being received from a first device in the set of mobile devices, the second algorithm having a greater accuracy than the first event detection algorithm, the analyzing detecting the event in the first data, the event occurring in a first geographical area;

program instructions to predict, using the event, a future event in a second geographical area;

program instructions to compute a target area, wherein the target area includes a location where the future event is likely to occur;

program instructions to send a notification about the future event to a second set of devices located in the target area.

14. The computer system of claim 13, further comprising:

program instructions to select a transmission method for the target area; and program instructions to send the notification to the transmission method wherein the transmission method causes the sending of the notification to the second set of devices.

15. The computer system of claim 13, further comprising:

program instructions to classify the event in a class, wherein the target area is a function of the class, and wherein the sending the notification is responsive to the class being configured for the notification.

16. The computer system of claim 13, further comprising:

program instructions to analyze a second data in the set of data, the second data being received from a second device in the set of mobile devices, the analyzing the second data detecting a second event of interest in the second data, the second event occurring in the first geographical area, the event and the second event forming a chain of events;

program instructions to compute a path taken by the chain of events; and program instructions to predict a future path, wherein the future path includes the location where the future event is likely to occur, and wherein the target area is selected based on the future path.

17. The computer system of claim 13, wherein the first geographical area is adjacent the second geographical area.

* * * * *